United States Patent
Libell et al.

(10) Patent No.: US 11,195,170 B1
(45) Date of Patent: Dec. 7, 2021

(54) METHOD AND A SYSTEM FOR CREATING A BEHAVIORAL USER PROFILE

(71) Applicant: BehavioSec Inc, San Francisco, CA (US)

(72) Inventors: Tony Libell, Lulea (SE); Jorge Diez Ferreras, Leon (ES)

(73) Assignee: BEHAVIOSEC INC, San Francisco, CA (US)

(*) Notice: Subject to any disclaimer, the term of this patent is extended or adjusted under 35 U.S.C. 154(b) by 0 days.

(21) Appl. No.: 17/334,879

(22) Filed: May 31, 2021

(51) Int. Cl.
*G06Q 20/36* (2012.01)
*H04L 29/08* (2006.01)
*H04L 29/06* (2006.01)
*G06F 21/31* (2013.01)
*G06F 21/45* (2013.01)

(52) U.S. Cl.
CPC ....... *G06Q 20/3672* (2013.01); *G06F 21/316* (2013.01); *G06F 21/45* (2013.01); *H04L 63/0861* (2013.01); *H04L 63/1408* (2013.01); *H04L 63/1416* (2013.01); *H04L 67/306* (2013.01)

(58) Field of Classification Search
CPC ............ G06Q 20/3672; H04L 63/1416; H04L 63/1408; H04L 63/0861; H04L 67/306; G06F 21/45
USPC .......................................................... 706/12
See application file for complete search history.

(56) References Cited

U.S. PATENT DOCUMENTS

| | | | | |
|---|---|---|---|---|
| 9,779,236 | B2* | 10/2017 | Abrams | G06F 21/55 |
| 2013/0191908 | A1* | 7/2013 | Klein | H04W 12/069 726/18 |
| 2016/0182502 | A1* | 6/2016 | Smith | H04L 63/0884 726/7 |
| 2017/0134412 | A1* | 5/2017 | Cheng | H04L 67/2842 |
| 2017/0140138 | A1* | 5/2017 | Samuel | H04W 12/069 |
| 2018/0285563 | A1* | 10/2018 | Browne | G06F 21/53 |
| 2019/0311261 | A1* | 10/2019 | Baldwin | G06N 3/049 |
| 2019/0342329 | A1* | 11/2019 | Turgeman | G06F 3/0488 |
| 2020/0137085 | A1* | 4/2020 | Kostyushko | G06F 21/562 |
| 2020/0302301 | A1* | 9/2020 | Anderson | G06N 20/10 |
| 2021/0176271 | A1* | 6/2021 | Yoshimura | H04L 63/1416 |

* cited by examiner

*Primary Examiner* — Badrinarayanan
(74) *Attorney, Agent, or Firm* — Michael J. Feigin, Esq.; Feigin and Fridman LLC

(57) ABSTRACT a user profile of behavior of a specific user is generated, including obtaining a plurality of dummy user profiles. An initial behavioral dataset relating to the behavior of the specific user during a specific transaction is collected, and compared to each of the plurality of dummy user profiles. When the initial behavioral dataset matches at least one of the plurality of dummy user profiles, the method further includes initiating a new user profile of the specific user to be equivalent to the at least a portion of at least one of the plurality of dummy user profiles, and further training the new user profile based on the initial behavioral dataset, to modify the new user profile to more accurately reflect behavior of the specific user.

16 Claims, 5 Drawing Sheets

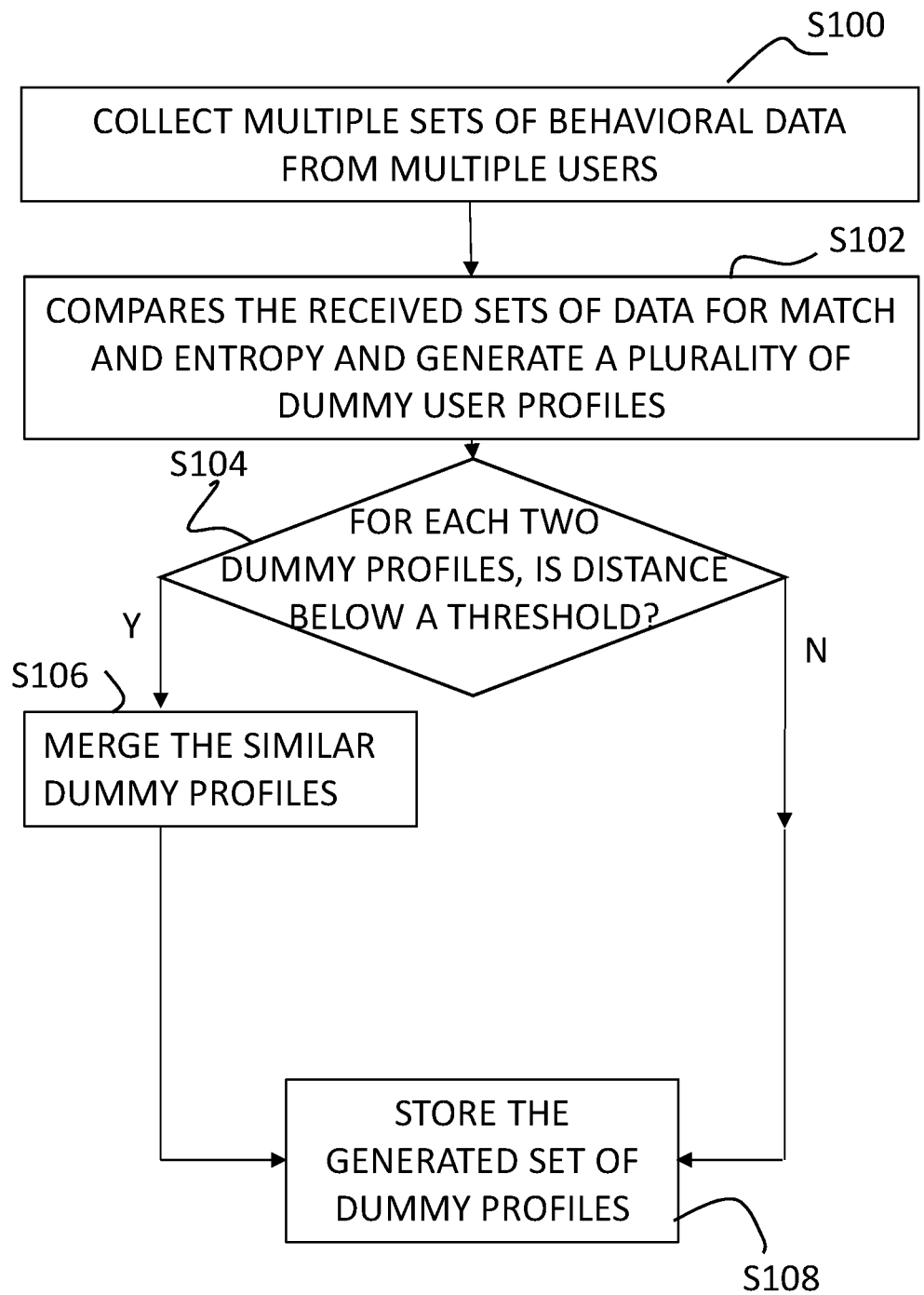

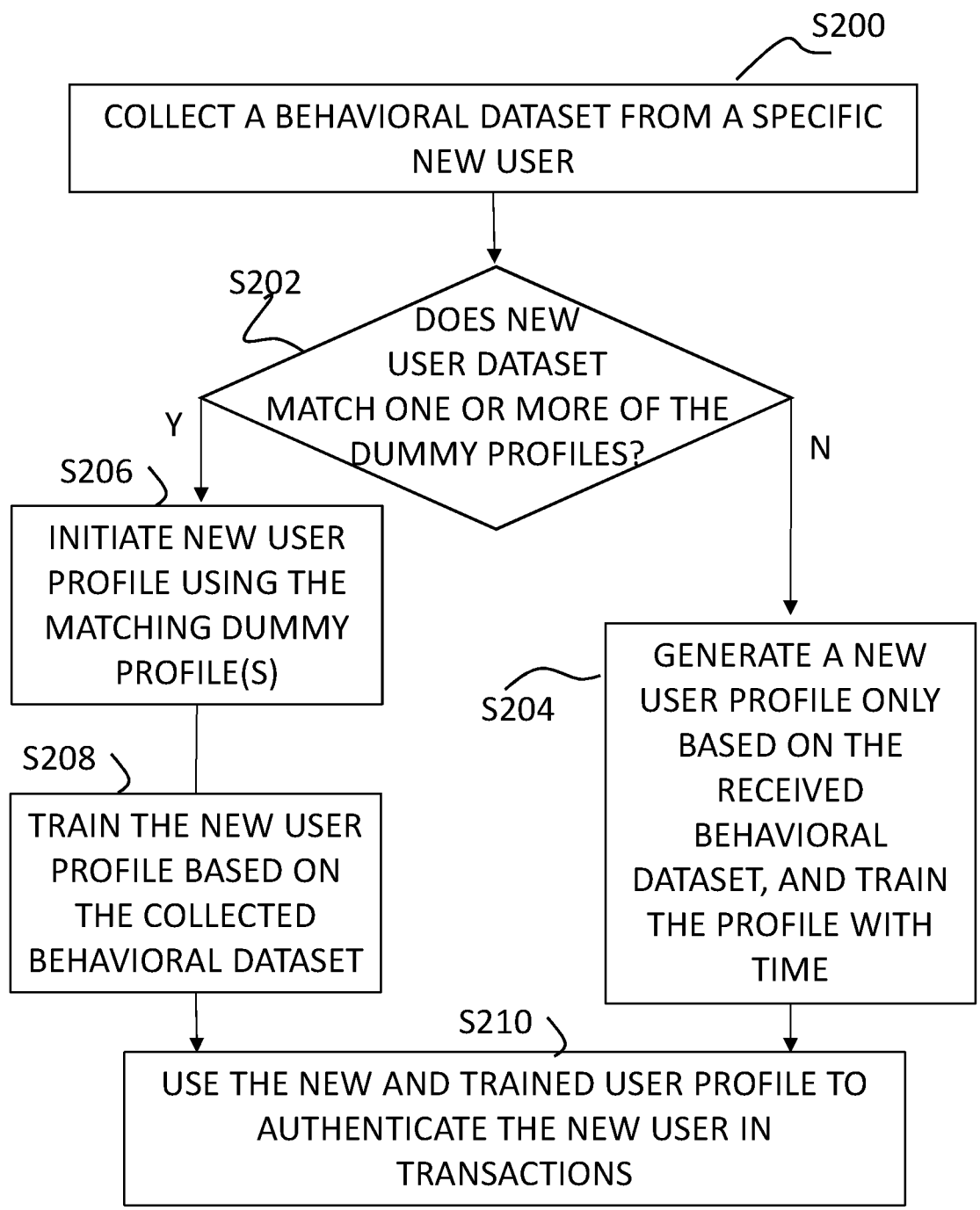

METHOD AND A SYSTEM FOR CREATING A BEHAVIORAL USER PROFILE

FIELD OF THE DISCLOSED TECHNOLOGY

The disclosed technology relates generally to authentication of users using behavioral user profiles, and, more specifically, to a method and a system for improving the creation of behavioral user profiles created using machine learning techniques, by creation of a specific user profile from a trained dummy profile.

BACKGROUND OF THE DISCLOSED TECHNOLOGY

Electronic devices are used by millions of people to perform many types of operations, such as communicating with other people (e.g. by email, instant messaging, phone calls, and video chats), capturing memories (e.g. taking pictures, videos, and voice recordings), entertainment (e.g. listening to music, watching videos, playing games), financial transactions (e.g. access to bank accounts, transferring funds, shopping) and the like.

Some of the more sensitive transactions that may be carried out using electronic devices, such as transactions requiring transfer of funds (e.g. shopping, bank account transactions, and the like), require authentication of the user in order to ensure that the user carrying out the transaction is indeed the human authorized to do so.

Various prior art systems and methods authenticate the user based on the behavior of the user, which may be learned over time using machine learning techniques. For example, behaviors that can be used to authenticate a user may include typing characteristics, mouse use characteristics, and the like. However, accurately training a user profile of a specific user, using machine learning methodologies, is often slow, particularly when little behavioral information is available per session, or when the user only carries out few sessions.

There is thus a need in the art for a system and method for improving the creation of a behavioral user profile for a specific user, using machine learning methodologies, such that the behavioral user profile will be created accurately and quickly, to ensure the accurate authentication of the specific user.

SUMMARY OF THE DISCLOSED TECHNOLOGY

The disclosed technology relates generally to authentication of users using behavioral user profiles, and, more specifically, to a method and a system for improving the creation of behavioral user profiles created using machine learning techniques, by creation of a specific user profile from a trained dummy profile.

In the context of the present specification and claims, the term "dataset" or "set of data" is defined as a data sample including all the data collected during a single recorded user session of a specific user, or during a single specific online transaction.

In the context of the present specification and claims, the terms "substantially" and "approximately" are defined as being within 10% of a target number or measure.

"Basic authorization" or "authentication" is defined as authorization to access some data with the device while other data remains inaccessible to the user until a "stepped up" or "second" authentication occurs.

"Explicit" inputs are those which, under normal circumstances, remain constant or substantially constant over time. "Time" for purposes of the prior definition can be defined as three months, one year, ten years, and/or a lifetime. For example, retinal patterns under normal circumstances (for the majority of people) remain substantially constant through one's entire adult life but for an accident (for a minority of people) whereas an angle of swiping the screen while scrolling (a behaviometric) can change over time and be substantially different even from one act to the next. However, behaviometric inputs often create recognizable patterns. "Behaviometric" is defined as "a measurement of a behavior of a user, the behavior being unexact to each other measurement thereof."

"Statistical tests" for purposes of this disclosure are defined as determining a distance of new behavioral samples of a variable (e.g. any/all keys or bigram flight times etc.) to the previously sampled distribution (the learned profile). In some embodiments, this is carried out by comparing the samples to a mean value of an assumed underlying distribution, which can be e.g. Gaussian or log-normal, or computing the Kullback-Leibler divergence which is a measure of the "surprise" or information gain of new samples to an underlying distribution, or if sufficient samples are available, perform a two-sample Kolmogorov-Smirnov or a Cucconi test to determine the similarity. In each of the above methods, a suitable accept/reject threshold (or "critical value") is set.

It should be understood that the use of "and/or" is defined inclusively such that the term "a and/or b" should be read to include the sets: "a and b," "a or b," "a," "b."

According to an aspect of some embodiments of the teachings herein, there is provided a method for generating a user profile of behavior of a specific user using a computing device associated with at least one input interface. The method includes obtaining a plurality of dummy user profiles, each dummy user profile reflecting the behavior of a group of users. The method further includes collecting, from the computing device, an initial behavioral dataset relating to the behavior of the specific user during a specific transaction, and comparing the initial behavioral dataset to each of the plurality of dummy user profiles. When the initial behavioral dataset matches at least one of the plurality of dummy user profiles, the method further includes initiating a new user profile of the specific user to be equivalent to the at least a portion of at least one of the plurality of dummy user profiles, and further training the new user profile based on the initial behavioral dataset, to modify the new user profile to more accurately reflect behavior of the specific user.

In some embodiments, the obtaining of the plurality of dummy user profiles includes collecting a plurality of datasets of user behaviors, each dataset corresponding to a transaction carried out by one of the group of users, clustering the plurality of datasets into groups, based on matches or similarities between ones of the plurality of datasets, where each group of datasets includes datasets that match one another, and generating, for each group of datasets, a corresponding dummy user profile, including values for behavioral characteristics, to obtain a group of dummy user profiles.

In some embodiments, each two dummy user profiles of the group of dummy user profiles are compared to each other. When a distance between the two dummy user profiles is smaller than a predetermined distance threshold, the two dummy user profiles are merged into a single dummy user profile. Following the comparing and the merging, the group of dummy user profiles includes the plurality of user profiles.

In some embodiments, for each group of datasets, the corresponding dummy user profile is not identical to any dataset in the group of datasets. In some embodiments, generating the corresponding dummy user profile includes assigning to each behavioral characteristic in the dummy user profile an average or a median of values of the behavioral characteristics in datasets in the group of datasets.

In some embodiments, a first of the plurality of dummy user profiles includes only values relating to a first set of behavioral characteristics, for example values relating to keyboard use, and a second of the plurality of dummy user profiles includes only values relating to a second set of behavioral characteristics, the second set of behavioral characteristics being different from the first set of behavioral characteristics, for example values relating to touchpad use.

In some embodiments, a first set of behavioral characteristics of the initial behavioral dataset matches a first portion of a first of the plurality of dummy user profiles, and a second set of behavioral characteristics of the initial behavioral dataset matches a second portion of a second of the plurality of dummy user profiles, the first and second sets of behavioral characteristics being different from each other. In some such embodiments, initiating a new user profile includes initiating the first set of behavioral characteristics of the new user profile to be equivalent to the first portion of the first dummy user profile and the second set of behavioral characteristics of the new user profile to be equivalent to the second portion of the second dummy user profile.

In some embodiments, comparing the initial behavioral dataset to each of the plurality of dummy user profiles includes computing a distance metric between the initial behavioral dataset and each of the plurality of dummy user profiles, and selecting a specific dummy user profile, or portion thereof, from which a distance of the initial behavioral dataset is minimal.

In some embodiments, the behavioral characteristics include any one or more of touch gesture characteristics, mouse use characteristics, keyboard use characteristics, device motion characteristics, application use characteristics, speech recognition characteristics, and transaction timing characteristics.

According to another aspect of some embodiments of the teachings herein, there is provided a device for generating a user profile for authenticating a specific user for access to protected information, the specific user being associated with a user computing device having an input interface. The device includes a storage element, storing a plurality of dummy user profiles, each dummy user profile reflecting the behavior of a group of users. A network interface is connected to a computer network, the computer network including the user computing device. At least one behavioral input device obtains, from the user computing device via the network interface, a dataset including behavioral information of the specific user. The device further includes a processor, functionally associated with storage element, the network interface, and the at least one behavioral input device, the processor obtaining from the behavioral input device an initial behavioral dataset relating to the behavior of the specific user during a specific transaction and comparing the initial behavioral dataset to each of the plurality of dummy user profiles. When the initial behavioral dataset matches at least one of the plurality of dummy user profiles the processor initiates a new user profile of the specific user to be equivalent to the at least a portion of at least one of the plurality of dummy user profiles and further trains the new user profile based on the initial behavioral dataset, to modify the new user profile to more accurately reflect behavior of the specific user.

In some embodiments, the computer network, connected to the network interface, includes a plurality of user-operated computing devices. In some embodiments, the at least one behavioral input device obtaining, from the plurality of user-operated computing devices via the network interface, a plurality of dataset including behavioral information of a plurality of users using the plurality of user-operated computing devices, the plurality of users excluding the specific user. In some such embodiments, prior to the processor obtaining the initial behavioral dataset, the processor additionally obtains from the behavioral input device a plurality of datasets of user behaviors, each dataset corresponding to a transaction carried out by one of the group of users. The processor then clusters the plurality of datasets into groups, based on matches or similarities between ones of the plurality of datasets, where each group of datasets includes datasets that match one another, and generates, for each group of datasets, a corresponding dummy user profile, including values for behavioral characteristics, to obtain a group of dummy user profiles. The processor stores the group of dummy user profiles in the storage element as the plurality of user profiles.

In some embodiments, prior to the processor storing the group of dummy user profiles, the processor further compares each two dummy user profiles of the group of dummy user profiles. When a distance between the two dummy user profiles is smaller than a predetermined distance threshold, the processor merges the two dummy user profiles into a single dummy user profile, thereby modifying the group of dummy user profiles includes the plurality of user profiles.

In some embodiments, for each group of datasets, the corresponding dummy user profile is not identical to any dataset in the group of datasets. In some embodiments, the processor generates the corresponding dummy user profile by assigning to each behavioral characteristic in the dummy user profile an average or a median of values of the behavioral characteristics in datasets in the group of datasets.

In some embodiments, a first of the plurality of dummy user profiles includes only values relating to a first set of behavioral characteristics, and a second of the plurality of dummy user profiles includes only values relating to a second set of behavioral characteristics, the second set of behavioral characteristics being different from the first set of behavioral characteristics.

In some embodiments, a first set of behavioral characteristics of the initial behavioral dataset matches a first portion of a first of the plurality of dummy user profiles, and a second set of behavioral characteristics of the initial behavioral dataset matches a second portion of a second of the plurality of dummy user profiles, the first and second sets of behavioral characteristics being different from each other. In such embodiments, the processor initiates a new user profile by initiating the first set of behavioral characteristics of the new user profile to be equivalent to the first portion of the first dummy user profile and the second set of behavioral characteristics of the new user profile to be equivalent to the second portion of the second dummy user profile.

In some embodiments, the processor compares the initial behavioral dataset to each of the plurality of dummy user profiles by computing a distance metric between the initial behavioral dataset and each of the plurality of dummy user profiles, and selecting a specific dummy user profile, or portion thereof, from which a distance of the initial behavioral dataset is minimal.

In some embodiments, the behavioral characteristics include any one or more of touch gesture characteristics, mouse use characteristics, keyboard use characteristics, device motion characteristics, application use characteristics, speech recognition characteristics, and transaction timing characteristics.

BRIEF DESCRIPTION OF THE DRAWINGS

FIGS. 1A and 1B are, respectively, a flowchart and a schematic block diagram of a method and a device for generating a plurality of dummy profiles, to be used for generating a behavioral user profile for a specific user, according to an embodiment of the teachings herein.

FIG. 2 is a flowchart of a method for generating a behavioral user profile for a specific user using the dummy profiles generated using the method and device of FIGS. 1A and 1B, according to an embodiment of the teachings herein.

DETAILED DESCRIPTION OF EMBODIMENTS OF THE DISCLOSED TECHNOLOGY

In an embodiment of the disclosed technology, multiple sets of behavioral data received from a plurality of users are matched, classified, and/or clustered to generate a plurality of dummy user profiles. The dummy user profiles need not necessarily correspond to the behavioral data of any specific user, and may be a combination of behaviors of various users. The dummy user profiles may be dummy user profiles relating to specific behavioral traits, for example dummy user profiles relating to keyboard use characteristics, dummy user profiles relating to mouse use characteristics, and the like.

When a set of behavioral data is collected for a new user, which does not yet have a user profile, the collected set of data is compared to the dummy profiles, and the closest one or more dummy profiles are used as a basis for the new user profile. In some cases, different dummy profiles may be used as a basis for different behavioral aspects of the new user profile, such as keyboard use characteristics and mouse use characteristics. The user's own information is then used to further train the new user profile, to make the new user profile unique, and accurate, to the new user. In future sessions, the new user profile is used, and may be further trained by additional datasets collected for the new user, in some cases to the point that the new user profile is unique and distinct from any of the dummy profiles. The new user profile may then be used to authenticate the user for online transactions, such as financial transactions and medical transactions.

Embodiments of the disclosed technology will become clearer in view of the following description of the drawings.

Figure 1B:
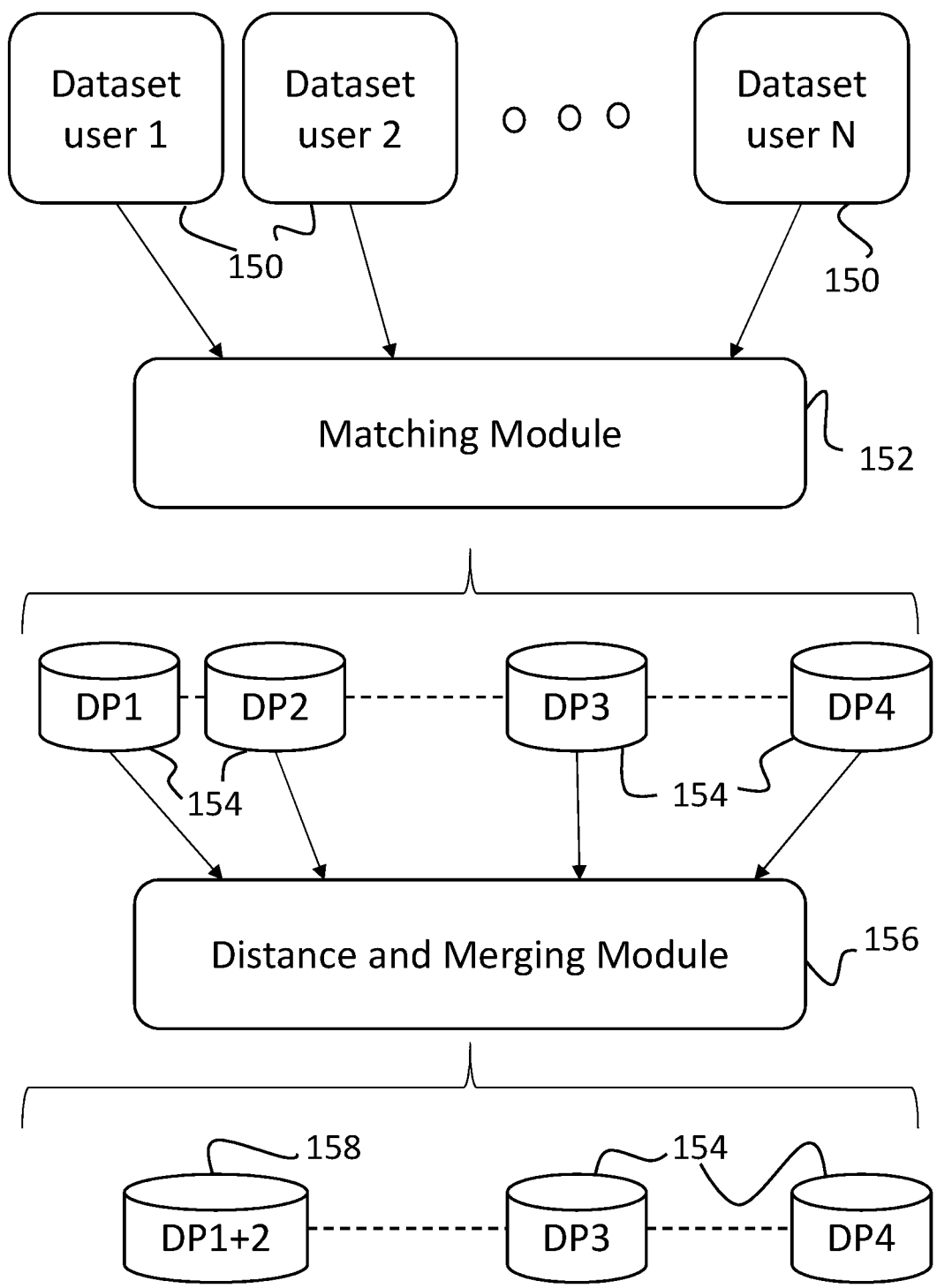

Reference is now made to FIGS. 1A and 1B, which are, respectively, a flowchart and a schematic block diagram of a method and a device for generating a plurality of dummy profiles, to be used for generating a behavioral user profile for a specific user, according to an embodiment of the teachings herein.

As seen in FIG. 1A, at an initial step S100 of the method, multiple behavioral datasets are collected from multiple users, indicated as sets 150a, 150b, 150n in FIG. 1B. The datasets may be collected using a plurality of user devices, as described hereinbelow, where each such user device is associated with a user interface used by a user during the transaction. In some embodiments, thousands, or even millions, of such behavioral datasets are collected from thousands of users. In some embodiments, the datasets are collected during a variety of online transactions, such as banking transactions, insurance transactions, online shopping, access to educational records, access to medical records, and the like.

The collected behavioral datasets may include data relating to touch gestures, such as angle of swipe, acceleration of swipe, velocity of swipe, time of flight, dominant side, area of swipe, curve fitting, heat map of swipe, distance of swipe). The collected behavioral datasets may include data relating to keyboard actions, such as a keystroke pattern, a keystroke style, keystroke dwell, keystroke flight time. The collected behavioral datasets may include data relating to the user moving a mobile device, for example captured by a gyrostatic sensor, accelerometer, and or positioning sensor of the device. The collected behavioral datasets may include data relating to use of one or more particular applications during transactions. The collected behavioral datasets may include data relating to speech recognition. The collected behavioral datasets may include data relating to timing of transactions and/or of one or more particular applications used for transactions, and the like.

The collected behavioral datasets are transmitted, for example from each user device, to a central matching module 152 (FIG. 1B) which may be a software module executed by a processor as described hereinbelow. As seen at step S102 of FIG. 1A, central matching module 152 compares the collected behavioral datasets for matches, and generates groups of datasets, where each group has matching datasets. This may be accomplished using clustering and/or classification algorithms, for example. In some embodiments, central matching module 152 groups the datasets to maximize the amount of non-overlapping information between each two groups.

The matching module 152 then turns each of the groups of matching datasets into a dummy profile, resulting in a plurality of dummy profiles indicated in FIG. 1B by reference numeral 154. Each such dummy profile is based on one or more behavioral datasets, but need not be identical to any of the datasets on which it is based. Rather, the dummy profile agglomerates the data. For example, for each behavioral characteristic in the dataset, the dummy profile may include an average, or a median, of the values of that behavioral characteristic in the datasets of the group.

As seen in FIG. 1B, the generated dummy profiles 154 are then processed by a distance and merging module 156 which may be a software module executed by a processor as described hereinbelow. As indicated at step S104 of FIG. 1A, distance and merging module 156 compares each two dummy profiles 154 to one another and determines whether a distance therebetween is below a predetermined threshold. For example, the distance between two dummy profiles may be measured according to a sum of heuristic distances or difference of behavioral characteristics between the two dummy profiles (e.g. for two dummy profiles, the distance can be the sum of difference in key dwell time, difference in key flight time, difference in mouse swipe acceleration, and difference in touch pressure). However, any other suitable distance metric may be used to determine the distance between two dummy profiles.

As seen at step S106, if the distance between two dummy profiles is below the threshold, those two dummy profiles are merged into a single, combined, dummy profile, for example by distance and merging module 156. This is shown, for example, in FIG. 1B, by merging of DP1 and DP2 into DP1+2, indicated by reference numeral 158. If the distance between two dummy profiles is above the threshold, the distance and merging module does not merge those profiles, and they remain as they were, as shown in FIG. 1B for DP3 and DP4, which retained their reference numeral 154. Turning to step S108, it is seen that the generated set of dummy profiles is stored, for example in non-transitory computer memory, for future use to generate a user profile for a new, specific, user, as described hereinbelow with respect to FIG. 2.

Reference is now made to FIG. 2, which is a flowchart of a method for generating a behavioral user profile for a specific user using the dummy profiles generated using the method of FIGS. 1A and 1B, according to an embodiment of the teachings herein.

As seen in FIG. 2, at an initial step S200 of the method, a behavioral datasets of a specific user, not having a defined user profile in the system, is collected during a specific transaction. The dataset may be collected using a user device associated with a user interface used by the specific user during the transaction. In some embodiments, the dataset may be collected during an online transactions, such as a banking transaction, an insurance transaction, an online shopping transaction, access to educational records, access to medical records, and the like.

The collected behavioral dataset may include data relating to touch gestures, such as angle of swipe, acceleration of swipe, velocity of swipe, time of flight, dominant side, area of swipe, curve fitting, heat map of swipe, distance of swipe). The collected behavioral dataset may include data relating to keyboard actions, such as a keystroke pattern, a keystroke style, keystroke dwell, keystroke flight time. The collected behavioral dataset may include data relating to the user moving a mobile device, for example captured by a gyrostatic sensor, accelerometer, and or positioning sensor of the device. The collected behavioral dataset may include data relating to use of one or more particular applications during transactions. The collected behavioral dataset may include data relating to speech recognition. The collected behavioral dataset may include data relating to timing of transactions and/or of one or more particular applications used for the transaction, and the like.

The behavioral dataset collected from the specific new user is compared to each of the stored dummy profiles, generate using the method of FIG. 1A, at step S202. A match between the dataset and one or more stored dummy profiles may be measured by the same metrics used to identify a match between datasets, or a distance between dummy profiles, in the method of FIG. 1A.

If the specific behavioral dataset does not match any of the dummy profiles, at step S204 a new user profile is created for the new specific user, and is trained only based on the dataset collected from that user, in a similar manner to that of the prior art. Otherwise, if the behavioral dataset matches one or more of the dummy profiles, at step S206 a new user profile is initiated to be equivalent to the matching dummy profile(s), and at step S208 that new user profile is trained, based on the collected behavioral dataset of the new specific user. For example, a greater weight may be given to the behavioral data of the specific user than to data in the dummy profile, to enable the new user profile to rapidly converge to be accurate for the new specific user.

In some embodiments, the match identified at step S204 may be a match to more than one dummy profile. For example, keyboard use characteristics of the new user's dataset may match keyboard use characteristics in a first dummy profile, while mouse use characteristics of the new user's dataset may match mouse use characteristics in a second dummy profile. In some embodiments, the relevant portions of each of the first and second dummy profiles may be combined to form the new user profile at step S206, which is then trained based on the new user's actual dataset at step S208.

At step S10, the new, trained, user profile, is used, during future transactions, to authenticate the new specific user. In behavioral systems, there is typically an enrollment phase and an authentication phase. In the enrollment phase, the behavior of the user is gathered on the client computer, and transferred to a behaviometric authentication system which generates a behavioral profile and stores it in a database.

In the authentication phase, the behavior of the user is gathered on the client computer, and is sent to the behavioral authentication system. The behavioral authentication system compares the received data with the associated behavioral profile. If the behavior of the user is similar to the behavior stored in the associated behavioral profile, the user is granted access to the protected application or the protected resource. The problem with this solution is that there is no possibility of adding multiple users to the same profile, as different users show different behaviors.

In many environments, such as banking applications or access control systems for sensitive information, multiple users may access the protected information or application with the same username or user credentials, such as a customer number and a user specific PIN. For example, this may occur when using "spouse accounts". In banking applications the users may be the owner of the account and his spouse, or multiple people in a company, where several people are allowed to manage a banking account while using the same customer number.

As behavioral methods are built to discriminate users based on their behavior, they cope poorly with authenticating users for shared accounts, as each of the user's authorized to access the account has his or her own unique behavior profile. Consequently, a behavior profile must be built for each authorized user, while being associated with a single customer number or identifier. As such, the behavioral profile for one customer number must consist of the stored behavior of several people. This is not possible with the above described solutions. Thus, needed in the art are more effective systems and methods for using behavioral information for authenticating several users using the same authentication information.

Accordingly, it is an object of the present invention to provide a device, a computer program and a method for identifying multiple users based on their behavior (and measurements thereof, which are "behaviometrics"). In the case of identifying multiple users, it is an additional object of the disclosed invention to authenticate these multiple users, for access to protected information using the user credential information. Such authentication is based on monitoring and gathering behavior information, so that a behavioral user profile and a behavioral user sample are formed and stored for multiple users, in association with the authentication information, so as to determine security clearance during future uses of said protected information, as described in the U.S. patent application Ser. No. 14/705,478, which is incorporated hereinabove by reference.

Figure 3A:
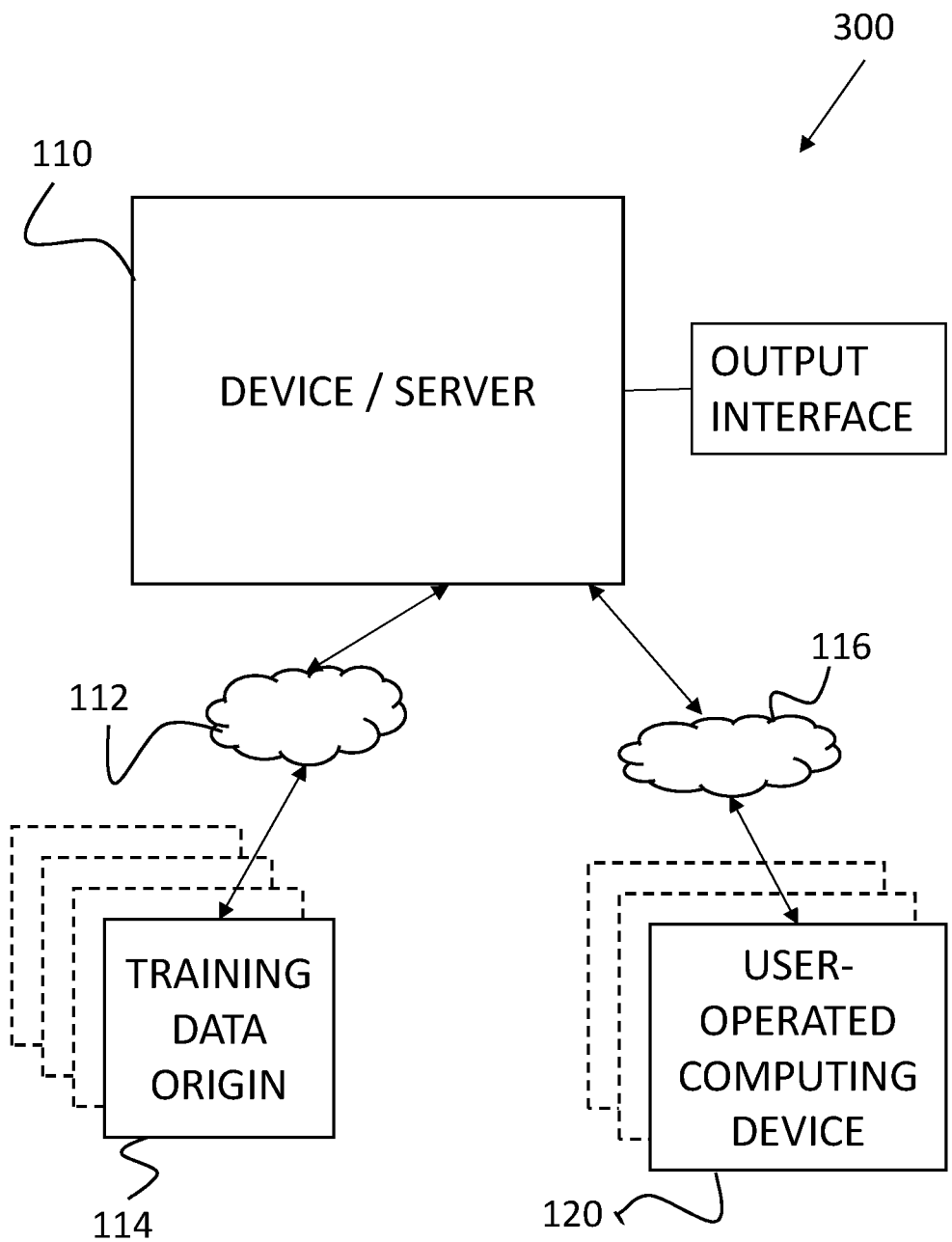
FIG. 3A is a block diagram of a system for generating a behavioral user profile for a specific user, using a plurality of dummy profiles, according to embodiments of the disclosed technology.

Reference is now made to FIG. 3A, which is a block diagram of a system 300 for generating a user profile for a specific user, using a plurality of dummy profiles, according to embodiments of the disclosed technology.

The system 300 includes a device 310, also termed a server herein, for generating and/or storing a plurality of dummy profiles and for generating a new user profile based on at least one dummy profile. In some embodiments, server 310 is also used for authenticating a user, during a transaction, using a generated user profile.

In embodiments in which server 310 generates the dummy profiles according to the method of FIG. 1A, the server 310 may be connected, via one or more packet switched networks 312, to a plurality of dataset origins 314, each associated with a user interface, which provide to server 310 a plurality of behavioral datasets used to generate dummy profiles, as described hereinabove with respect to FIGS. 1A and 1B, for example via network 314. In such embodiments, server 310 may include matching module 152 and distance and merging module 156, described hereinabove with respect to FIG. 1B.

Server 310 is further connected, via a packet switched network 316, to at least one user operated computing device 320, which is functionally associated with a user interface and is adapted to be used by a specific user to carry out a specific online transaction. In some embodiments, the new user dataset, used to define the profile for the new user, is transmitted to server 310, from computing device 320, via network 316.

In some embodiments, packet switched networks 312 and 316 may be a single packet switched network.

Server 310 typically includes at least one network interface for communication to packet switched networks 312 and/or 316, a server processor 332 in communication with the network interface, and a server nontransitory computer readable storage medium 334 storing instructions for execution by server processor 332. For example, storage medium 334 may store instructions for carrying out steps S200, S202, S204, S206, S208, and/or S210 of FIG. 2. In some embodiments, storage medium 334 may also store instructions for carrying out steps S100, S102, S104, S106, and/or S108 of FIG. 1A, such as the instructions of matching module 152 and of distance and merging module 156 of FIG. 1B.

Storage medium 334 of server 310, or a different storage medium included in, or functionally associated with, server 310, stores the dummy profiles, generated according to the method of FIG. 1A and used in the method of FIG. 2.

In some embodiments, server 310 may be associated with an output interface 326, such as a screen or audio speaker, for providing output to an operator.

Figure 3B:
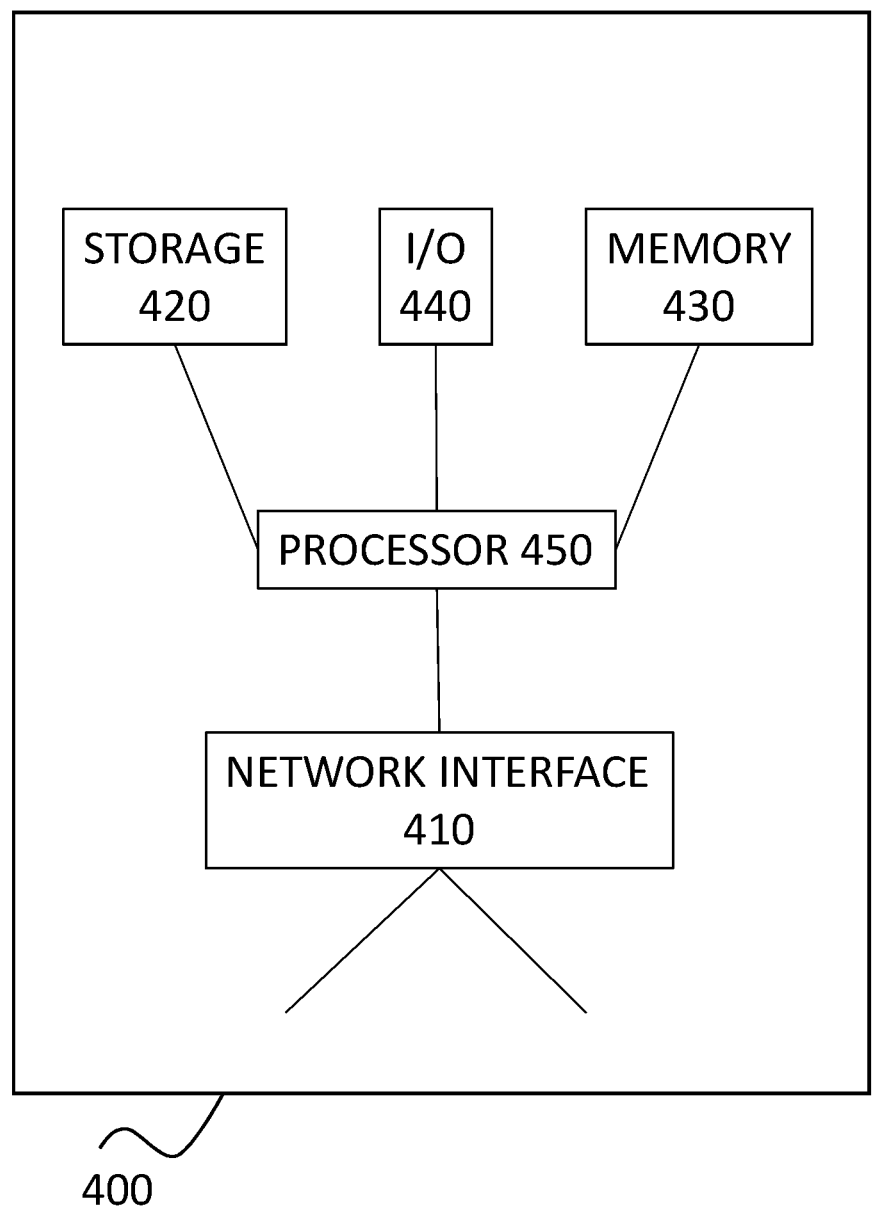
FIG. 3B is a high level block diagram of devices used to carry out embodiments of the disclosed technology.

FIG. 3B shows a high level block diagram of a device 400 used to carry out embodiments of the disclosed technology, such as dataset origins server 310, dataset origins 314, and user device 316. Device 400 comprises a processor 450 that controls the overall operation of the computerized device by executing the device's program instructions which define such operation. The device's program instructions may be stored in a storage device 420 (e.g., magnetic disk, database) and loaded into memory 430 when execution of the console's program instructions is desired. For example, the storage device 420 may store instructions for collecting a set of behavioral data during an online transaction. Thus, the device's operation will be defined by the device's program instructions stored in memory 430 and/or storage 420, and the console will be controlled by processor 450 executing the console's program instructions.

A device 400 also includes one or a plurality of input network interfaces for communicating with other devices via a network (e.g., the internet). The device 400 further includes an electrical input interface. A device 400 also includes one or more output network interfaces 410 for communicating with other devices. For example, the output network interfaces 410 may facilitate communication between device 400 and the central server.

Device 400 also includes input/output 440 representing devices which allow for user interaction with a computer (e.g., display, keyboard, mouse, speakers, buttons, etc.). Such input devices may be used when the user interacts with the computerized device during the online transaction, such that the data relating thereto can be collected by the processor.

A computing device may be a mobile computing device, defined as any portable electronic device with a processor that carries out instructions, and having at least one wireless packet-switched network connection, an input for user interaction, and a visible display with which a user may interact. Examples of mobile computing devices may be, but are not limited to, mobile phones, tablets, personal digital assistants (PDAs), laptops, netbooks, smart watches, e-readers, and/or digital cameras. The computing device may be a desktop computer, defined as any traditional stationary or portable electronic device with a processor that carries out instructions, and having at least a network connection, an input for user interaction, and a visible display with which a user may interact.

The components of a mobile computing device are tied to an operating system which is defined as coded instructions configured to instruct a hardware device to carry out mathematical operations or electrical interactions with physical components electrically or wirelessly connected to one another, as well as user interaction therewith. Examples of operating systems may include iOS, Android, BlackBerry OS and Microsoft operating systems.

One skilled in the art will recognize that an implementation of an actual device will contain other components as well, and that FIG. 3B is a high-level representation of some of the components of such a device for illustrative purposes. It should also be understood by one skilled in the art that the method and devices depicted in FIGS. 1A through 3A may be implemented on a device such as is shown in FIG. 3B.

It is a particular feature of the disclosed technology that the use of the methods and systems of FIGS. 1A, 1B, and 2, improves the function of a computerized authentication system, by facilitating the generation of an accurate user profile, for a specific user, more rapidly than when using prior art systems. This improves the authentication of users, and ensures that transactions are more secure, particularly when a user is new, because the user's behavior is learned more rapidly, and thus the user's profile more accurately reflects the user's behavior.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method for generating a user profile of behavior of a specific user using a computing device associated with at least one input interface, the method comprising:
    obtaining a plurality of dummy user profiles, each dummy user profile reflecting the behavior of a group of users;
    collecting, from said computing device, an initial behavioral dataset relating to the behavior of the specific user during a specific transaction;
    comparing the initial behavioral dataset to each of the plurality of dummy user profiles;
    in response to a determination that said initial behavioral dataset is a best match or one of a plurality of best matches above a threshold to at least one of said plurality of dummy user profiles:
        initiating a new user profile of said specific user to be equivalent to said at least a portion of at least one of said plurality of dummy user profiles; and
        further training said new user profile based on said initial behavioral dataset, to modify said new user profile to more accurately reflect behavior of said specific user; and
    generating, for each group of datasets including values for behavioral characteristics, a corresponding dummy user profile,
    i, to obtain a group of dummy user profiles
    comparing each two dummy user profiles of said group of dummy user profiles; and
    in response to a determination that a distance between said two dummy user profiles is smaller than a predetermined distance threshold, merging said two dummy user profiles into a single dummy user profile,
    wherein, following said comparing and said merging, the group of dummy user profiles comprises said plurality of datasets.

2. The method of claim 1, wherein said obtaining a plurality of dummy user profiles further comprises:
    collecting a plurality of datasets of user behaviors, each dataset corresponding to a transaction carried out by one of said group of users; and
    clustering said plurality of datasets into groups, based on matches or similarities between ones of said plurality of datasets, where each group of datasets includes datasets that match one another.

3. The method of claim 2, wherein, for each group of datasets, said corresponding dummy user profile is not identical to any dataset in said group of datasets.

4. The method of claim 2, wherein said generating said corresponding dummy user profile comprises assigning to each behavioral characteristic in the dummy user profile an average or a median of values of said behavioral characteristics in datasets in said group of datasets.

5. The method of claim 1, wherein a first of said plurality of dummy user profiles includes only values relating to a first set of behavioral characteristics, and a second of said plurality of dummy user profiles includes only values relating to a second set of behavioral characteristics, the second set of behavioral characteristics being different from the first set of behavioral characteristics.

6. The method of claim 1, wherein, in response to a determination that a first set of behavioral characteristics of said initial behavioral dataset matches a first portion of a first of said plurality of dummy user profiles, and a second set of behavioral characteristics of said initial behavioral dataset matches a second portion of a second of said plurality of dummy user profiles, the first and second sets of behavioral characteristics being different from each other, said initiating a new user profile comprises initiating said first set of behavioral characteristics of said new user profile to be equivalent to said first portion of said first dummy user profile and said second set of behavioral characteristics of said new user profile to be equivalent to said second portion of said second dummy user profile.

7. The method of claim 1, wherein said comparing the initial behavioral dataset to each of the plurality of dummy user profiles comprises computing a distance metric between said initial behavioral dataset and each of the plurality of dummy user profiles, and selecting a specific dummy user profile, or portion thereof, from which a distance of the initial behavioral dataset is minimal.

8. The method of claim 1, wherein said behavioral characteristics include any one or more of touch gesture characteristics, mouse use characteristics, keyboard use characteristics, device motion characteristics, application use characteristics, speech recognition characteristics, and transaction timing characteristics.

9. A device for generating a user profile for authenticating a specific user for access to protected information, the specific user being associated with a user computing device having an input interface, the device comprising:
    a storage element, storing a plurality of dummy user profiles, each dummy user profile reflecting the behavior of a group of users;
    a network interface connected to a computer network, the computer network including the user computing device;
    at least one behavioral input device obtaining, from the user computing device via said network interface, a dataset including behavioral information of the specific user; and
    a processor, functionally associated with storage element, said network interface, and said at least one behavioral input device, said processor:
        obtaining from said behavioral input device an initial behavioral dataset relating to the behavior of the specific user during a specific transaction;
        comparing said initial behavioral dataset to each of the plurality of dummy user profiles; and
        in response to a determination that said initial behavioral dataset matches at least one of said plurality of dummy user profiles:
            initiating a new user profile of said specific user to be equivalent to said at least a portion of at least one of said plurality of dummy user profiles; and
            further training said new user profile based on said initial behavioral dataset, to modify said new user profile to more accurately reflect behavior of said specific user;
        clustering said plurality of datasets into groups, based on matches or similarities between ones of said plurality of datasets, where each group of datasets includes datasets that match one another;
        wherein prior to said processor storing said group of dummy user profiles, said processor further:
        comparing each two dummy user profiles of said group of dummy user profiles; and
            in response to a determination that a distance between said two dummy user profiles is smaller than a predetermined distance threshold, merging said two dummy user profiles into a single dummy user profile, thereby modifying said group of dummy user profiles comprises said plurality of user profiles.

10. The device of claim 9, wherein:

said computer network, connected to said network interface, includes a plurality of user-operated computing devices;

said at least one behavioral input device obtaining, from said plurality of user-operated computing devices via said network interface, a plurality of dataset including behavioral information of a plurality of users using said plurality of user-operated computing devices, said plurality of users excluding said specific user; and prior to said processor obtaining said initial behavioral dataset, said processor additionally:

obtaining from said behavioral input device a plurality of datasets of user behaviors, each dataset corresponding to a transaction carried out by one of said group of users;

generating, for each group of datasets, a corresponding dummy user profile, including values for behavioral characteristics, to obtain a group of dummy user profiles; and storing said group of dummy user profiles in said storage element as said plurality of user profiles.

11. The device of claim 10, wherein, for each group of datasets, said corresponding dummy user profile is not identical to any dataset in said group of datasets.

12. The device of claim 10, wherein said processor generating said corresponding dummy user profile comprises said processor assigning to each behavioral characteristic in the dummy user profile an average or a median of values of said behavioral characteristics in datasets in said group of datasets.

13. The device of claim 9, wherein a first of said plurality of dummy user profiles includes only values relating to a first set of behavioral characteristics, and a second of said plurality of dummy user profiles includes only values relating to a second set of behavioral characteristics, the second set of behavioral characteristics being different from the first set of behavioral characteristics.

14. The device of claim 9, wherein in response to a determination that a first set of behavioral characteristics of said initial behavioral dataset matches a first portion of a first of said plurality of dummy user profiles, and a second set of behavioral characteristics of said initial behavioral dataset matches a second portion of a second of said plurality of dummy user profiles, the first and second sets of behavioral characteristics being different from each other, said processor initiating a new user profile comprises said processor initiating said first set of behavioral characteristics of said new user profile to be equivalent to said first portion of said first dummy user profile and said second set of behavioral characteristics of said new user profile to be equivalent to said second portion of said second dummy user profile.

15. The device of claim 9, wherein said processor comparing the initial behavioral dataset to each of the plurality of dummy user profiles comprises said processor computing a distance metric between said initial behavioral dataset and each of the plurality of dummy user profiles, and selecting a specific dummy user profile, or portion thereof, from which a distance of the initial behavioral dataset is minimal.

16. The device of claim 9, wherein said behavioral characteristics include any one or more of touch gesture characteristics, mouse use characteristics, keyboard use characteristics, device motion characteristics, application use characteristics, speech recognition characteristics, and transaction timing characteristics.

* * * * *